United States Patent Office 3,182,062
Patented May 4, 1965

3,182,062
SYNTHESIS OF QUINOXALINES AND
ANALOGUES THEREOF
Irwin J. Pachter, Erdenheim, and Joseph Weinstock,
Phoenixville, Pa., assignors to Smith Kline & French
Laboratories, Philadelphia, Pa., a corporation of
Pennsylvania
No Drawing. Filed Feb. 28, 1962, Ser. No. 176,444
10 Claims. (Cl. 260—250)

This invention relates to a novel process for preparing heterocyclic compounds possessing as an essential part of their nucleus a condensed aromatic pyrazine structure. More precisely the heterocyclic compounds produced by the process of this invention have the following basic structure:

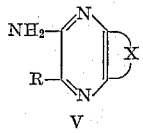

V in which X is an aromatic residue comprising as ring members solely carbon atoms and a maximum of 2 nitrogen atoms. Exemplary of the condensed aromatic rings claimed are those in which X taken together with the two aromatic carbon atoms to which it is attached represents a phenyl, naphthyl, pyrimido, pyrazolo or pyrido moiety. As will be noted hereafter, the basic structures described above can be optionally substituted by unreactive organic radicals common to the art such as by hydroxyl, amino, lower alkylamino, lower dialkylamino, lower alkylthio, lower alkoxy, heterocyclic amino alkyl, phenyl, thienyl, etc. groups. Such substitution will be made as desired by one skilled in the art using known synthetic methods to obtain compounds having desired utility as known to the art. These substitutents do not affect the novel reaction of this invention except as described hereafter.

The term R denotes an alkyl or aryl moiety having a maximum of 12 carbon atoms. Exemplary of such groups are lower alkyl, cycloalkyl for instance cyclohexyl or cyclopentyl, phenyl, thienyl, N-methyl-pyrrolidinyl, lower alkoxy, phenoxy, carbamyl or amino-lower alkyl. The chemical character of R must be such that it is stable toward elimination during the cyclization step of the reaction. For example, it has been found that when R is an arylmercapto or alkylmercapto moiety it is eliminated during cyclization to give the 2-acyl heterocyclic compound rather than the 2-mercapto derivative.

The process of this invention has made possible production of heterocyclic compounds as discussed above in good yield and using nitrosoamines with easily prepared acylmethylene cyanides (substituted acetonitriles). The process is believed to be very novel in that no similar reaction is known to the art.

The compounds produced by the process of this invention have various utilities. Most universal is their use in known reactions as intermediates for preparing medicinally active compounds. Many of the compounds have utility as nuclei for preparing dyestuffs or for their own inherent fluorescence or dyestuff character. Other products have activity in themselves as medicinal agents such as diuretics, antihypertensives, vasodilators for instance coronary arterial dilators, antibacterials, antifolic acid compounds or micro-organism antagonists such as anti-*Lactobacillus casei*, *Streptococcus faecalis*, *Staphyloccocus aureus* or *Escherichia coli* agents.

While the nature of the products produced by the process of this invention is not particularly dependent on the nature of the X ring or its substituents the full scope of this invention will be illustrated by concentrating illustrative examples in the pteridine series whose end products are known to have antifolic acid or diuretic/antihypertensive activities. Similar reactions in various series containing other nuclei will be apparent from the examples provided.

The process of this invention comprises reacting an o-nitrosoamine (II) with an acylmethylene cyanide (I) to give the desired 2-aminopyrazino heterocyclic end product (V). It is believed that this novel process passes through the novel intermediates of structures III and IV as follows:

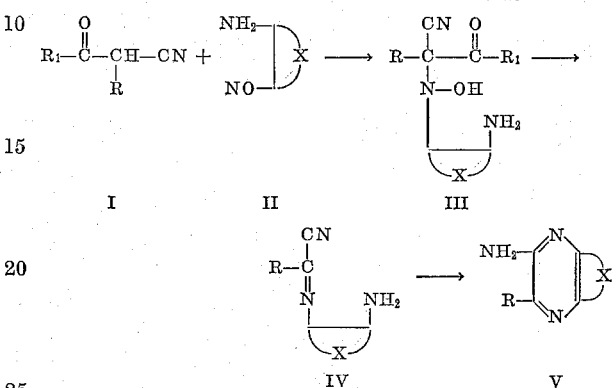

I II III

IV V

The novelty of the process of this invention is apparent from the reaction sequence I→V. It is indeed surprising that such a ring closure can be effected by elimination of an acyl moiety to give the desired 2-aminopyrazino heterocycle in good yield. R in these reaction sequences is as defined herebefore; $R_1$ is, for example, an aryl, alkyl, carbalkoxy, or alkoxy, any of which have a maximum of 8 carbon atoms. Several of the $R_1$ moieties which are particularly useful are phenyl, nitrophenyl, trifluoromethylphenyl, halophenyl, lower alkyl, carbomethoxy, carbethoxy or lower alkoxy. Since an acyl moiety

$(R_1C-)$ is eliminated during the reaction, the specific character of the $R_1$ group is unimportant other than being readily available, stable under the reaction conditions and sufficently activating to make the adjacent methylene moiety reactive as described hereafter.

The nitrone type intermediates are not usually isolated in the reaction but the 2-aminopyrazino heterocycle end product is immediately isolated in acceptable purity and yield. It should be noted that the reactivity of the methylene group of the acylmethylenecyanide (I) and the nitroso group of the o-nitrosoamine (II) can be influenced by other substituents in their respective structures. For example in the exemplary pteridine series (see below), the 2-amino moiety of the 2,6-diamino-5-nitrosopyrimidine starting material tends to deactivate the nitroso group because of the electropositive nature of the amine substituent. This effect can be compensated by using an electronegative moiety for $R_1$ in the acylmethylene cyanide (I) such as p-nitrophenyl, methoxy or carbomethoxy. While very high yields are realized using strongly electronegative groups at either $R_1$ or $R_2$, or both, the reaction is operative under forcing conditions when electropositive groups are present such as amino for $R_2$ in structure X. Similar effects when described fully as hereabove will be apparent to one skilled in the art who can choose the desired reactants to prepare the sought 2-aminopyrazino heterocycles in the best possible yield.

This process is carried out by reacting substantially equimolar quantities of the acylmethylene cyanide (I) and o-nitrosoamine (II) in a solvent in which the reactants are substantially soluble such as in a lower alkanol preferably ethanol or methanol, N,N-dimethylformamide, N,N-dimethylacetamide, aqueous mixtures thereof or the like.

The reaction is usually run at elevated temperatures for instance from about 65° C. to the reflux temperature of the reaction mixture for from about ½ to about 24 hours. The preferred reaction conditions are in ethanol or methanol solvent or aqueous mixtures thereof at the reflux temperature of the mixture for from 1 to 6 hours. Preferably present is at least one molar equivalent of a weak base for example an alkali metal lower alkoxide, an alkali metal lower alkanoic acid, or preferably an alkali metal cyanide. Advantageously, either sodium or potassium cyanide are used in excess. Conditions other than those outlined have not been found to have any additional significant advantage.

The starting materials are well known or prepared by readily known methods closely analogous to those for preparing known compounds. The o-nitrosoamines, for example, may be prepared by nitrosating the amines. For example, such compounds are prepared in U.S. Patent Nos. 2,963,481, 2,975,180, 2,963,479 and 2,963,478. Other o-nitrosoamines are well known, for instance, 2,4-diamino-1-nitrosobenzene, 2,4-diamino-5-methyl-1-nitrosobenzene, 2-amino-1-nitrosonaphthalene, 1-amino-2-nitrosonaphthalene which give interesting carcinogen analogues related to quinoxaline. The acetonitriles (acylmethylenecyanides) are prepared by methods well known to the art for preparing nitriles for instance reaction of a halide with sodium or potassium cyanide. Most conveniently these acylacetonitriles are produced by reacting a lower alkyl ester preferably a methyl or ethyl ester having the desired acyl moiety

with the corresponding nitrile ($RCH_2CN$). The reactive α-hydrogen of the nitrile is condensed with the methoxy or ethoxy group of the ester to give the desired acylmethylenecyanide. Further details of this reaction are given in the examples.

The scope of the process of this invention in preparing each of the heterocyclic systems will be readily apparent to one skilled in the art. The scope is exemplified by the following discussion in the very important 7-aminopyrimido[4,5-b]pyrazine (pteridine) series. These compounds are particularly useful as diuretic or antihypertensive compounds or as intermediates for preparing such compounds. The scope is illustrated as follows:

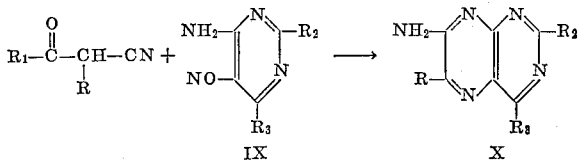

in which R and $R_1$ are defined as above;

$R_2$ is aryl, amino, lower alkylamino, di-lower alkylamino, cyclic amino such as piperidinyl, alkyl, hydrogen, hydroxy or alkylthio, all having a maximum of 8 carbon atoms. The preferred groups are phenyl, amino or lower alkylthio. The latter moiety is particularly useful as an intermediate for preparing the 2-amino derivatives by condensation with an excess of the desired amine such as ammonia with advanced temperatures in a closed system if necessary;

$R_3$ is an amino, lower alkylamino, di-lower alkylamino, hydrogen, cyclic amino such as piperidino, alkyl, hydroxy or alkylthio, all having a maximum of 8 carbon atoms. Preferred is the amino moiety.

The reactions in preparing 7-aminopyrimido-[4,5-b]-pyrazines using 4-nitroso-6-aminopyrimidines are carried out under the same reaction conditions as described above.

The following terms as used herein and in the claims are defined as follows:

"Lower alkanol"—a straight or branched chain aliphatic alcohol having 1–6, preferably 1–3, carbon atoms. Methanol, ethanol or isopropanol are preferred.

"Alkyl"—straight or branched alkyl or cycloalkyl having a maximum of 8 carbon atoms.

"Lower alkyl"—straight or branched alkane having 1–6 carbon atoms, preferably 1–3.

"Aryl"—a cyclic organic residue containing only carbon, monosulfur, nitrogen or mono-oxygen as ring members of an aromatic system having a total maximum of 8 carbon atoms. The aromatic ring system may be substituted in well known "inert" substituents often referred to as "garbage radicals" which are nontoxic such as halogen, methyl, methoxy, trifluoromethyl, etc. Phenyl or thienyl are preferred.

"Lower alkoxy"—straight or branched alkyloxy having 1–6 carbon atoms, preferably 1–3.

"Alkali metal"—as commonly defined in the art with sodium, potassium or calcium cations preferred.

"Lower alkoxide"—alkanyloxy moiety having 1–6 carbon atoms, preferably 1–3.

"Lower alkanoic acid"—a fatty acid having 1–6 carbon atoms, preferably 1–3.

One skilled in the art will recognize that the processes of this invention are not applicable in certain instances where the nitrosoamine starting material cannot be prepared. This is particularly true in the benzene and pyridine series. Completely representative starting materials have been mentioned which outline this choice clearly. For instance o-nitrosoaniline or 3-nitroso-2-aminopyrimidine cannot be prepared due to lack of reactivity to nitrosation or self-condensation. The amine or hydroxy substituted analogues are readily available (see Heterocyclic Compounds, 14, II, 481). In the preferred pteridine series, the nitroso starting materials are easily prepared over a full range of substituents as exemplified hereafter.

The following examples will make the use of the process of this invention apparent to one skilled in the art and should not be construed as limiting the scope of this invention thereto.

This application is a continuation-in-part of our co-pending application, Serial No. 172,856, filed February 13, 1962, now abandoned.

*Example 1*

A mixture of 8.6 g. of (0.04 mole) of 4,6-diamino-5-nitroso-2-phenylpyrimidine, 6 g. (0.12 mole) of sodium cyanide, 19.2 g. [0.12 mole, prepared from ethyl benzoate and propionitrile as described in J. Am. Chem. Soc., 54, 2962 (1932)] of α-benzoylpropionitrile and 250 ml. of 80% ethyl alcohol is heated under reflux for 4½ hours. The mixture is concentrated to 50 ml. in vacuo. Cooling separated 4,7-diamino-6-methyl-2-phenylpteridine; pale yellow needles from methanol, M.P. 308–309° C.

*Example 2*

A mixture of 4.3 g. of 4,6-diamino-5-nitroso-2-phenylpyrimidine, 3 g. of sodium cyanide, 5.4 g. of α-benzoylphenylacetonitrile and 300 ml. of aqueous methyl alcohol is heated at reflux for 12 hours. Concentrating and cooling gives the desired 4,7-diamino-2,6-diphenylpteridine.

Substituting a molar equivalent of 2,4,6-triamino-5-nitrosopyrimidine and aqueous dimethylformamide in the above reaction gives, after 24 hours of refluxing, 2,4,7-triamino-6-phenylpteridine.

*Example 3*

A mixture of 2.15 g. of 4,6-diamino-5-nitroso-2-phenylpyrimidine, 2.6 g. of α-cyanoethylpropionate (Boone, Perkin, Soc. 67, 421), 1.0 g. of sodium cyanide, 10 ml. of water and 30 ml. of ethyl alcohol is heated at reflux for 24 hours. Concentrating and cooling gives 4,7-diamino-6-methyl-2-phenylpteridine, M.P. 308–309° C.

*Example 4*

A mixture of 1.2 g. of 6-amino-4-dibutylamino-5-nitroso-2-phenylpyrimidine (U.S. Patent No. 2,975,180), 1 g. of potassium cyanide, 2.3 g. of α-benzoylpropionitrile and 150 ml. of aqueous ethyl alcohol is heated at reflux for 10 hours. Working up as described gives 4-dibutylamino-2-phenyl-7-amino-6-methylpteridine.

Example 5

A mixture of 1.3 g. of 4,6-diamino-2-methylthio-5-nitrosopyrimidine, 1.5 g. of potassium cyanide, 3.5 g. of α-benzoylpropionitrile, 1.5 g. of sodium cyanide in 200 ml. of aqueous isopropanol is heated at reflux for 15 hours. Cooling and evaporation gives the desired 4,7-diamino-2-methylthio-6-methylpteridine, M.P. 305° C.

Example 6

A mixture of 120 g. of ethyl benzoate and 43.2 g. of sodium methoxide is stirred at 80° C. for two hours while 86 g. of cyclohexylacetonitrile [J. Org. Chem. 25, 877 (1960)] is added gradually. The reaction mixture is maintained at 115–120° C. for 10 hours, then diluted with an ice-water slurry in the cold. Ether is added and the aqueous layer acidified. The organic layer is taken off, washed, dried and distilled to give α-benzoylcyclohexylacetonitrile, B.P. 165–190° C./1 mm., M.P. 45–46° C.

A mixture of 1.4 g. of 4,6-diamino-5-nitroso-2-phenylpyrimidine, 3.5 g. of sodium cyanide, 23.7 g. of the nitrile, 60 ml. of water and 180 ml. of ethanol is heated at reflux for 36 hours then isolated as described to give 6-cyclohexyl-4,7-diamino-2-phenylpteridine, M.P. 338–340° C. from dilute acetic acid.

Example 7

A mixture of 1.6 g. of 4,6-diamino-5-nitroso-2-hydroxypyrimidine, 2.0 g. of α-(p-nitrobenzoyl)-phenylacetonitrile, 1 g. of sodium cyanide and 150 ml. of aqueous ethyl alcohol is heated at reflux for 36 hours. Working up as described above gives 4,7-diamino-2-hydroxy-6-phenylpteridine.

Example 8

A mixture of 1.7 g. of α-benzoylbutyronitrile [prepared as in Dorsch, J. Am. Chem. Soc., 54, 2960 (1932)], 1.07 g. of 4,6-diamino-5-nitroso-2-phenylpyrimidine, 0.5 g. of sodium cyanide, 10 ml. of water and 30 ml. of ethyl alcohol is heated under reflux for 8 hours. After cooling and separation, 4,7-diamino-6-ethyl-2-phenylpteridine, M.P. 276–280° C., is obtained.

Example 9

A mixture of 1.9 g. of α-cyanobenzoylacetamide (prepared by reacting α-bromo-benzoylacetamide with potassium cyanide as described), 1 g. of 4,6-diamino-5-nitroso-2-(β-thienyl)-pyrimidine, 0.75 g. of sodium cyanide and 100 ml. of aqueous ethyl alcohol is heated at reflux for 10 hours. Cooling gives 6-carbamyl-4,7-diamino-2-(β-thienyl)-pteridine.

Substituting 4,6-diamino-5-nitroso-2-phenyl-pyrimidine gives 6-carbamyl-4,7-diamino-2-phenylpteridine.

Example 10

A mixture of 2.5 g. of ethyl β-phenyl-β-cyano-α-ketopropionate (prepared by condensing ethyl formate with benzyl cyanide as in Organic Reactions I, 266), 1 g. of 4,6-diamino-5-nitroso-2-phenylpyrimidine and 1 g. of sodium cyanide in aqueous isopropanol is heated at reflux for 6 hours cooled and worked up as described above to give 4,7-diamino-2,6-diphenylpteridine.

Example 11

A mixture of 12.9 g. of 4,6-diamino-5-nitroso-2-phenyl-pyrimidine, 6 g. of sodium cyanide, 27 g. of α-benzoylphenylpropionitrile (M.P. 80–81° C. prepared similarly to the procedure of Example 6), 15 ml. of water and 225 ml. of ethanol is heated under reflux for 20 hours. The solvent is removed under diminished pressure. The residue is suspended in water and filtered to give 6-benzyl-4,7-diamino-2-phenylpteridine, M.P. 280–281° C.

Example 12

A mixture of 2.4 g. of α-benzoyl-4-(N-piperidino)-butyronitrile [M.P. 96–97° C., prepared as in Example 6 from ethyl benzoate and 4-(N-piperidino)-butyronitrile], 1.2 g. of 4,6-diamino-5-nitroso-2-phenylpyrimidine, 0.8 g. of potassium cyanide and 50 ml. of aqueous methanol is heated at reflux for 8 hours. Working up as described gives 2-phenyl-4,7-diamino-6-β-piperidinoethylpteridine.

Example 13

A mixture of 2 g. of 3-nitroso-2,6-diaminopyridine, 4.5 g. of α-benzoylpropionitrile, 1.5 g. of sodium cyanide in aqueous ethanol is heated at reflux for 18 hours then worked up as described to give 2,6-diamino-3-methylpyridopyrazine.

Example 14

A mixture of 1.5 g. of 2,4-diamino-1-nitroso-benzene, 2 g. of α-cyanoethylpropionate, 0.75 g. of sodium cyanide and 150 ml. of aqueous ethanol is heated at reflux for 12 hours. Cooling and concentration gives 2,7-diamino-3-methylquinoxaline.

Example 15

A mixture of 3.3 g. of 2-amino-1-nitrosonaphthalene, 4 g. of α-cyanoethylpropionate, 1.6 g. of sodium cyanate and 200 ml. of aqueous methanol is heated at reflux for 16 hours to give 2-amino-3-methylbenzoquinoxaline.

Example 16

A mixture of 2.1 g. of 4,6-diamino-5-nitroso-2-phenylpyrimidine, 3 g. of α-benzoyl-α-thienylacetonitrile (prepared as in Example 6 using α-thienylacetonitrile and ethyl benzoate), 1.5 g. of sodium methoxide and aqueous ethanol is heated at reflux for 8 hours to give 4,7-diamino-6-α-thienyl-2-phenylpteridine.

Example 17

A mixture of 1 g. of 4,7-diamino-2-methylthio-6-phenylpteridine and 15 ml. of pyrrolidine is heated at reflux for 24 hours. Cooling and washing with water gives the desired 4,7-diamino-2-N-pyrrolidinyl-6-phenylpteridine.

Example 18

Substituting the following reactants for those of Example 1 in equimolar amounts gives the following:

4,6-diamino-5-nitroso-2-(p-tolyl)-pyrimidine plus α-benzoylpropionitrile gives 4,7 - diamino-2-(p-tolyl)-6-methylpteridine.

4,6-diamino-5-nitroso-2-(α-thienyl)-pyrimidine plus α-benzoylpropionitrile gives 4,7-diamino-2-(α-thienyl)-6-methylpteridine, 6 - amino-4-methylamino-5-nitroso-2-phenylpyrimidine plus α-cyanoethylpropionate gives 4-methylamino-7-amino-6-methyl-2-phenylpteridine.

4,6 - diamino-5-nitroso-2-(p-trifluoromethylphenyl)-pyrimidine plus α-benzoylpropionitrile gives 4,7-diamino-2-(p-trifluoromethylphenyl)-6-methylpteridine, 4,6-diamino-5-nitrosopyrimidine plus α-benzoylphenylacetonitrile gives 4,7-diamino-6-phenylpteridine, 4,6-diamino-5-nitroso-2-methylpyrimidine plus α-benzoylpropionitrile gives 4,7-diamino-2,6-dimethylpteridine, 2-amino-3-nitroso-6-hydroxypyridine plus α-benzoylphenylacetonitrile gives 2-amino-3-phenyl-7-hydroxypyridopyrazine, 2,4-diamino-5-methyl-1-nitrosobenzene plus α-benzoylcyclohexylacetonitrile gives 2,7-diamino-3-cyclohexyl-6-methylquinoxaline, 4,6-diamino-5-nitroso-2-phenylpyrimidine plus α-cyanomethylethyl ketone gives 4,7-diamino-2-phenyl-6-methylpteridine, 3-amino - 4 - nitrosophenol plus α-benzoylbutyronitrile gives 2-amino-7-hydroxy-3-ethylpyridopyrazine, 4,6-diamino-5-nitroso-2-methylthiopyrimidine plus α-benzoylcyclohexylacetonitrile gives 4,7-diamino-2-methylthio-6-cyclohexylpteridine, 4,6-diamino-5-nitrosopyrimidine plus α-benzoylcyclohexylacetonitrile gives 4,7-diamino-6-cyclohexylpteridine, 2,4,6-triamino-5-nitrosopyrimidine plus α-p-nitrobenzoylcyclohexylacetonitrile (prepared as in Example 6) gives 2,4,7-triamino-6-cyclohexylpteridine, 4,6-diamino-5-nitroso-2-methylthiopyrimidine plus α-benzoylphenylpropionitrile gives 6-benzyl-4,7-diamino-2-methylthiopteridine, 2,4,6-triamino-5-nitrosopyrimidine plus α-p-trifluorobenzoylphenylpropionitrile (prepared similarly to Example 11) gives 2,4,7-triamino-6-benzylpteridine, 4,6-diamino-5-nitroso-2-phenylpyrimidine plus α-benzoylbenzyloxyacetonitrile (prepared as in Example 6 from ethyl benzoate plus benzyloxyacetonitrile) gives 4,7-diamino-2-phenyl-6-benzyloxypteridine, 4,6-diamino-5-nitroso-2-methylpyrimidine plus α-benzoylmethoxyacetonitrile (prepared as in Example 6 from known methoxyacetonitrile plus ethyl benzoate) gives 4,7-diamino-2-methyl-6-methoxypteridine, 2,4,6-triamino-5-nitrosopyrimidine plus α-p-nitrobenzoylphenoxyacetonitrile (prepared as described using ethyl-p-nitrobenzoate) gives 2,4,7-triamino-6-phenoxypteridine, 4,6-diamino-5-nitroso-2-methylthiopyrimidine plus α-benzoylphenoxyacetonitrile gives 4,7-diamino-2-methylthio-6-phenoxypteridine, 4,6-diamino-5-nitroso-2-hydroxypyrimidine plus α-p-nitrobenzoylphenoxyacetonitrile gives 4,7-diamino-2-hydroxy-6-phenoxypteridine, 4,6-diamino-5-nitroso-2-phenylpyrimidine plus α-benzoylphenoxyacetonitrile (prepared from phenoxyacetonitrile plus ethyl benzoate as in Example 6) gives 4,7-diamino-2-phenyl-6-phenoxypteridine.

What is claimed is:

1. A method of preparing a heterocyclic compound of the structure:

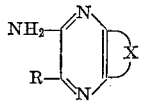

in which R is a member selected from the group consisting of lower alkyl, cyclohexyl, cyclopentyl, phenyl, thienyl, N-methylpyrrolidinyl, lower alkoxy, phenoxy, carbamyl and amino-lower alkyl; and X is a condensed aromatic residue which, when taken together with the two carbon atoms to which it is attached, is a member of the group consisting of phenylene, naphthylidene, pyrimidinediyl and pyridinediyl; comprising reacting an acylmethylene cyanide of the structure:

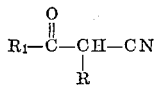

in which R is as defined hereinbefore and $R_1$ is a member selected from the group consisting of phenyl, lower alkyl, carbo-lower-alkoxy and lower alkoxy, with a o-nitrosoamine of the structure:

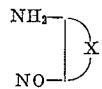

in which X is as defined hereinbefore, at from about 65° C. to the reflux temperature of the reaction mixture in a solvent selected from the group consisting of ethanol, methanol, isopropanol and aqueous mixtures thereof in the presence of a basic agent selected from the group consisting of an alkali metal lower alkoxide, an alkali metal lower alkanoic acid and an alkali metal cyanide.

2. The method of claim 1 characterized in that the heterocyclic compound formed is a 7-aminopteridine.

3. The method of claim 1 characterized in that the basic agent is an alkali metal cyanide.

4. The method of claim 3 characterized in that the heterocyclic compound formed is a 7-aminopteridine.

5. The method of claim 1 characterized in that the heterocyclic compound formed is a 2-aminoquinoxaline possessing a minimum of one substituent in its phenylene ring selected from the group consisting of amino and hydroxy.

6. The method of claim 1 characterized in that the heterocyclic compound formed is a 2-aminopyridopyrazine possessing a minimum of one substituent in its pyridinediyl ring selected from the group consisting of amino and hydroxy.

7. A method of preparing a 4,7-diamino-6-lower-alkyl-2-phenylpteridine comprising reacting an α-benzoyl-lower-alkylcyanide with 4,6-diamino-5-nitroso-2-phenylpyrimidine in the presence of an alkali metal cyanide in an aqueous lower alkanol solvent at the reflux temperature of the reaction mixture.

8. The method of claim 7 characterized in that α-benzoylpropionitrile is used as starting material.

9. A method of preparing a 2,7-diamino-3-loweralkyl-quinoxaline comprising reacting an α-cyanoloweralkyl-propionate with 2,4-diamino-1-nitrosobenzene in the presence of an alkali metal cyanide in an aqueous lower alkanol solvent at the reflux temperature of the reaction mixture.

10. A method of preparing a 2,6-diamino-3-methylpyridopyrazine comprising reacting α-benzoylpropionitrile with a 2,6-diamino-3-nitrosopyridine in the presence of an alkali metal cyanide in an aqueous lower alkanol solvent at the reflux temperature of the reaction mixture.

References Cited in the file of this patent

UNITED STATES PATENTS

| | | |
|---|---|---|
| 2,665,275 | Campbell | Jan. 5, 1954 |
| 2,667,486 | Cain | Jan. 26, 1954 |
| 2,940,972 | Roch | June 14, 1960 |
| 2,963,481 | Grannells | Dec. 6, 1960 |
| 3,104,242 | Osdene | Sept. 17, 1963 |

OTHER REFERENCES

Fissekis et al.: J. Org. Chem., vol. 24 (1959), pages 1722–5.

Spickett et al.: J. Chem. Soc., London (1954), pages 2887–95.